United States Patent [19]
Showalter

[11] Patent Number: 6,125,595
[45] Date of Patent: Oct. 3, 2000

[54] INSULATED ELECTRICAL SHOCK TUBE

[76] Inventor: Gregory J. Showalter, 54 Maplewood Ave., West Seneca, N.Y. 14224

[21] Appl. No.: 08/891,118

[22] Filed: Jul. 10, 1997

[51] Int. Cl.[7] ..................................................... A01K 3/00
[52] U.S. Cl. ............................................. 52/101; 119/57.9
[58] Field of Search .............................. 52/101; 119/56.1, 119/52.3, 57.9

[56] References Cited

U.S. PATENT DOCUMENTS

| | | | |
|---|---|---|---|
| 4,110,943 | 9/1978 | Carlson | 52/101 |
| 5,285,747 | 2/1994 | Caldine | 119/57.9 |
| 5,834,686 | 11/1998 | Barrett et al. | 52/101 X |
| 5,864,292 | 1/1999 | Roestenberg et al. | 119/57.9 |
| 5,878,537 | 3/1999 | Flischel | 52/101 |
| 5,937,788 | 8/1999 | Boyd | 119/57.9 |

*Primary Examiner*—Creighton Smith
*Attorney, Agent, or Firm*—Pitts & Brittian, P.C.

[57] ABSTRACT

An improved electrical shocking device to deter pests in a variety of applications. More specifically but not exclusive to squirrels attempting access to birdfeeders. The insulated electrical shock tube comprises a hollow voltage insulating tube (30), with it's exterior surface criss-crossed with a bare secured electrical circuit (100) insulated at disposed areas (40, 50, 60), and a power supply connector (70) providing electrical shock stimuli to animals when contact is made to the bare secured electrical circuit surrounding the insulated tube secured to support pole of birdfeeder. In an alternate embodiment the shock tube can be installed horizontally at roof overhangs to deter pigeons and other animals from nesting and spoiling roof (FIG. 6.) In another embodiment the shock tube can be hung on expensive landscaping or fruit trees where deer try to feed (FIG. 7.). Still another embodiment the shock tube can be for commercial use around trash areas or electric power sub-stations where racoon and possoms are a problem and poisons are undersirable. Another alternate embodiment of the shock tube can be around flower and vegetable gardens in isolated areas where an electric fence is not wanted.

19 Claims, 4 Drawing Sheets

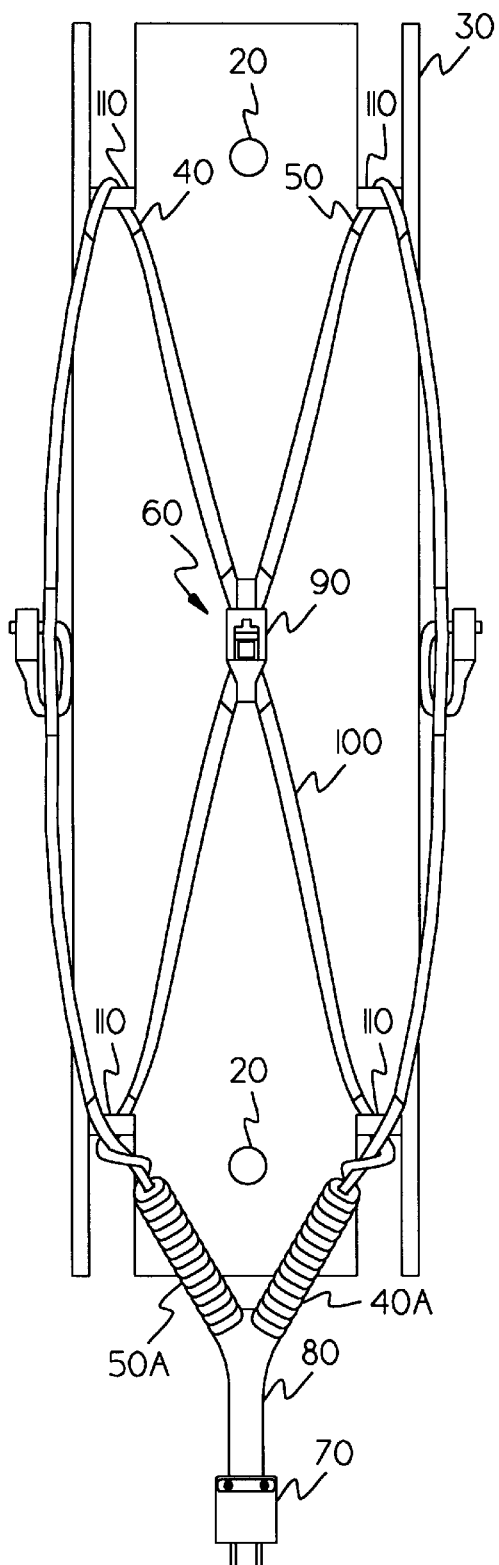
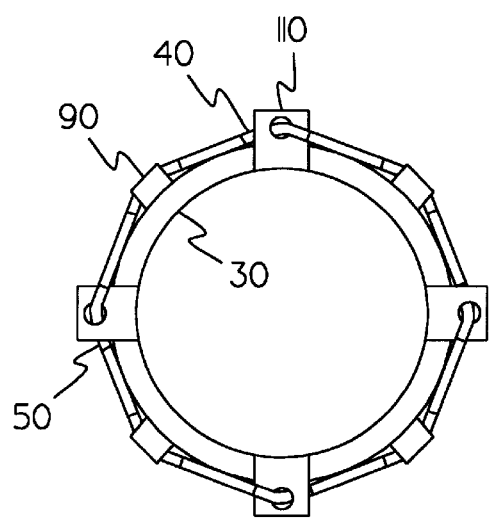
Fig. 4
Fig. 5

INSULATED ELECTRICAL SHOCK TUBE

BACKGROUND

1. Field of Invention

This invention relates to pest control at birdfeeders specifically by delivering an electical shock to squirrels at birdfeeders.

2. Description of Prior Art

Detering squirrels from birdfeeders has become top priority to the birdfeeding public. A squirrels instinct to hord food costs untold dollars worldwide to birdlovers.

The east of food supply and the number of litters produced each year by squirrels are directly related. More food, more squirrels, more bird seed consumption. Good for the bird seed industry and bad for the consumer.

Various products available to the public to address this problem proves the need and desire for a solid solution to the ongoing battle with this distructive rodent.

Baffles have been manufactured of various shapes and sizes made or plastics or tin alloys. More commonly, these half moon or cone shaped items are mounted above, below, or constructed as the roof of feeders. Use of these worked temporarily until the squirrel chews through or conquers the obstical. A squirrel's teeth grow on average of 6" per year. They have to chew anything to keep their teeth short and functional. If something is in the way of their food supply, if not 100% effective, they will succeed and get to the food.

U.S. Pat. No. 5,191,857 to Boaz (1993) shows us that baffles as described previously, are ineffective by the meer need to electrify them as he does.

The disadvantages in the Boaz invention are the expensive electronics required to produce the high step up voltage to shock the pest. Because of the high voltage you need top quality insulating material to prevent voltage tracking. When horizontal baffles become contaminated by bird droppings, dirt, dust or moisture, voltage tracking will occur and the product will malfunction unless routinely cleaned. The Boaz invention is powered by D.C. batteries. This is an ongoing expense to the consumer and adds to our pollution problem.

Also, there are three different pole installations shown or required which are confusing, intimidating, non-universal, and time consuming to the installer.

In U.S. Pat. No. 5,392,732 to Fry (1995), here a mounted plate is used. The plate is energized and insulated from a conductive support pole. This disadvantages here are, if a non-conductive pole is used, additional purchases of the invention are needed and it requires more involved wiring. Because of the high step-up voltage putout by the transformer, we again have the problem of expense in electronics and high quality insulation. Also, with the design of the horizontal plate, voltage tracking will occur as debris builds up causing product malfunction if not regularly cleaned.

Installation is more involved and spacing is critical on a non-conductive pole. The pest could easily avoid shock if spacing is to great or to small. On a conductive pole, if plate is mounted too close to the ground, pest could simply jump over electified plate avoiding shock.

This system is not universal. It cannot be used at all if birdfeeder is suspended from a tree. Also, additional hardware has to be purchased for invention to function, for example: ground rod and ground clamp.

Finally, in U.S. Pat. No. 5,471,951 to collins (1995) is an electrified bird feeder. Unlike the Boaz Patent birdfeeder U.S. Pat. No. 5,191,857, this is only applied to tilt style birdfeeders. The big disadvantage in both feeders is you have to buy the specific birdfeeder. Your selection is limited and expensive due to the all inclusive electronics, insulation and feeder. Being battery operated it is an ongoing expense to the consumer and landfills.

All of the previously practiced methods have primarily the same pitfalls.

(a) They are expensive to manufacture, therefore expensive to the public.

(b) Installation is confusing, intimidating and time consumming.

(c) Not one of these electrical deterrants is universal to all applications in the field.

(d) There are additional costs to the consumer after the original purchase.

(e) Routine cleaning is required to prevent product malfunction due to voltage tracking.

(f) Electronics can malfuntion in time.

(g) Moving parts are subject to wear, jamming and the elements.

OBJECTS AND ADVANTAGES

Several objects and advantages of the present invention are:

(a) to provide an insulated electric shock tube totally new with low cost production in mind;

(b) to provide a shock tube with no electronic step-up voltage parts;

(c) to provide a shock tube with no moving wearable parts;

(d) to provide a shock tube that is universal to any pole or hanging installation of birdfeeder;

(e) to provide a shock tube that is not confusing, intimidating or time consuming to install;

(f) to provide a shock tube that is virtually cost free to operate after purchase;

(g) to provide a shock tube that is environmentally safe to operate. No batteries to fill dump sites;

(h) to provide a shock tube that is maintenance free. No cleaning required to prevent voltage tracking due to high step-up voltage used;

(i) to provide a shock tube that operates on low voltage, regular household current;

(j) to provide a shock tube that will not accidentally shock birds;

There is virtually no power consumption by the insulated electrical shock tube because of it being an open electrical circuit. The only power consumed by the shock tube is the split second the climbing animals body closes the circuit receiving a shock. The shock tube is safer than the wall plug or nightlight in a childs bedroom when installed at proper height.

The shock tube is so successful you only need to use it on a new pest to your area. Once a squirrel has become acquainted with the shock tube, it rarely comes back. If the animal decides to return, it usually will stay on the ground at the base of the pole and eat what the birds have dropped.

With this shock tube the birds now return and feed in your back yard for you to enjoy and save money on bird seed.

Further objects and advantages of my invention will become apparent from a consideration of the drawings and ensuing description.

DRAWING FIGURES

In the drawings, the figures show various views, aspects, functions and desired embodiments of the present invention. The numbers separate parts and functions. Closely related figures have alphabetical suffixes.

FIG. 4 shows a close-up front view of the preferred embodiment of a insulated electrical shock tube.

FIG. 5 shows a close-up overhead view of the preferred embodiment of a insulated electrical shock tube.

REFERENCE NUMERALS IN DRAWINGS

- 10 eye screws
- 20 mounting holes
- 30 insulated tube
- 40 insulation left intact on neutral wire
- 40a horizontally wrapped neutral end wire
- 50 insulation left intact on positive wire
- 50a horizontally wrapped postitive end wire
- 60 location where neutral and positive wries cross
- 70 electrical power connector
- 80 heat shrink around insulation wire
- 90 plastic wire ties
- 100 bare portion of wires
- 110 wire holders

SUMMARY

In accordance with the present invention an insulated electrical shock tube comprises an insulated tube, with the exterior surface of that tube criss-crossed with an open bare electrical circuit anchored and insulated in specific areas and an electrical power connector to join to an electric power supply.

DESCRIPTION

Figure 1:
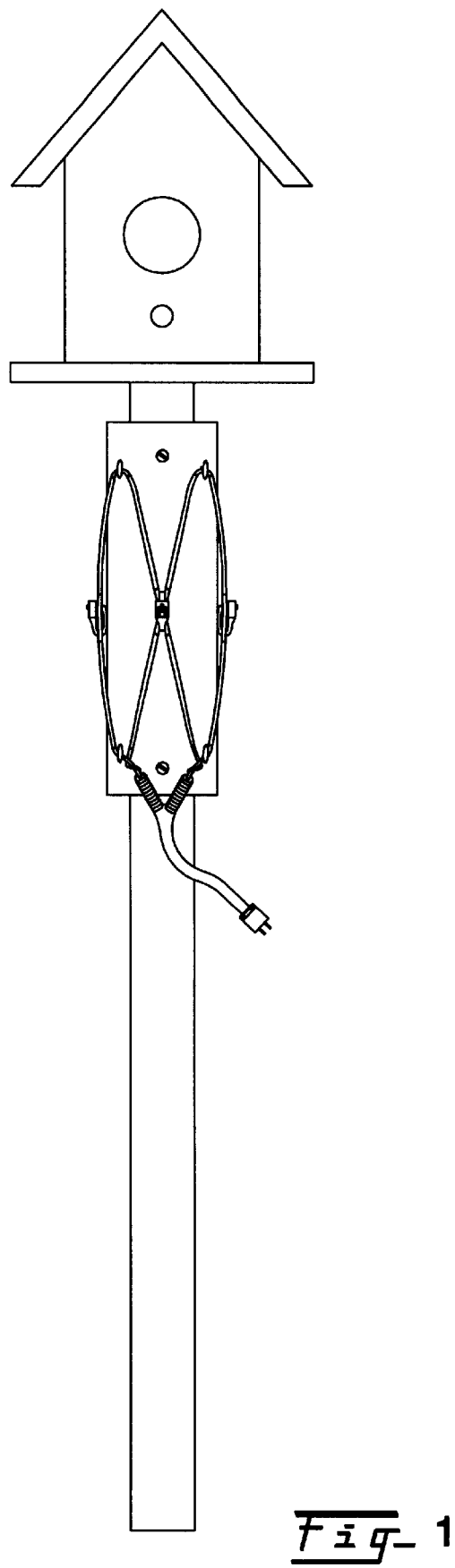
FIG. 1 shows a front view of a insulated electrical shock tube installed on a birdfeeder support pole, showing the physical arrangement and electrical interconnections.
Figure 2:
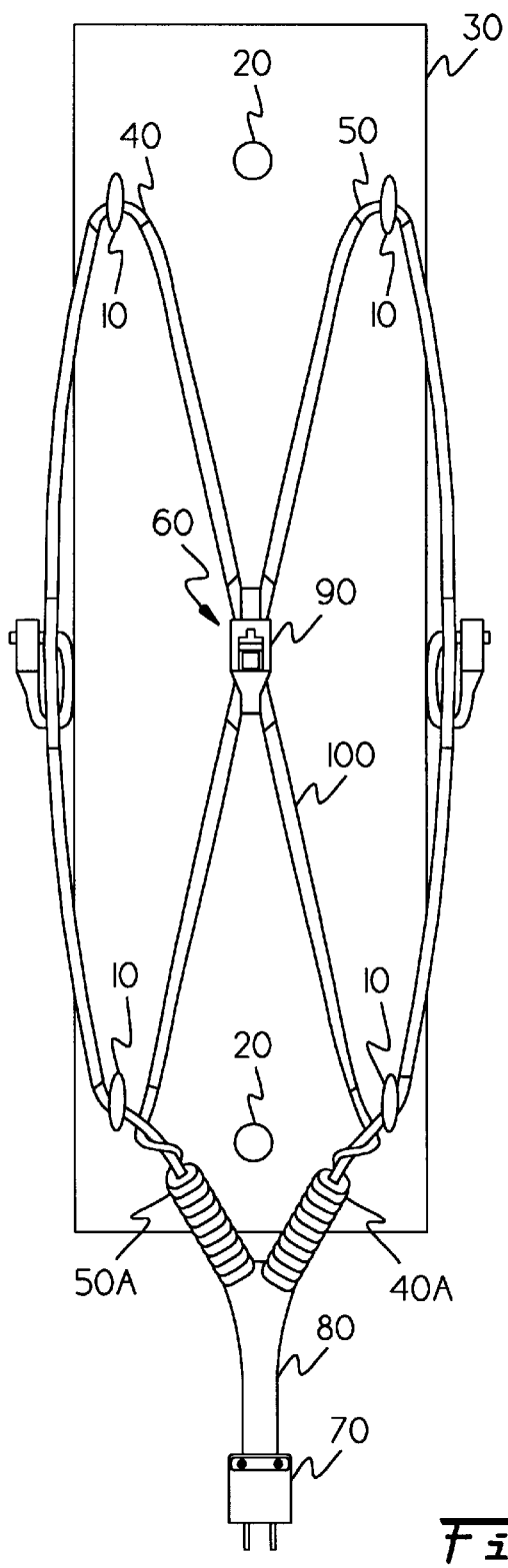
FIG. 2 shows a close-up view of a insulated electrical shock tube.
Figure 3:
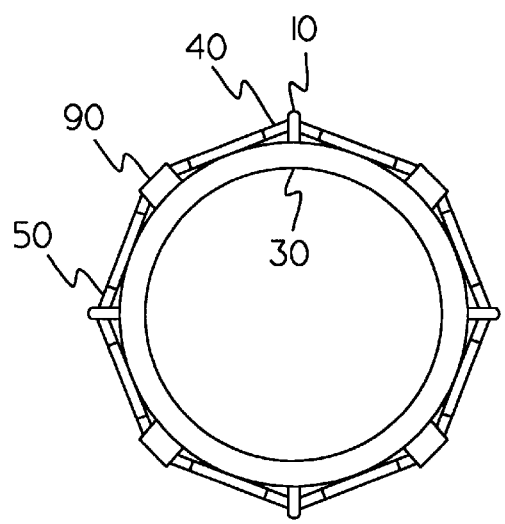
FIG. 3 shows a close-up overhead view of a insulated electrical shock tube.

A typical embodiment of the insulated electrical shock tube is illustrated in FIG. 1 (front view). A insulated tube (30) is made of rigid plastic pipe. Polyvinyl Chloride pipe, rubber, recycled plastic, wood, any material that will insulated power supply voltage may be used. The insulated tube in the preferred embodiment is Polyvinyl Chloride pipe 1' long×1½" diameter×¼" thick. This also can be any shape length, diameter and thickness to accomodate the support pole. Eye screws (10) are small metal alloy screws ⅛–¼" long and have a ¹⁄₁₆–⅛ diameter eye hole for the head of the screw. They are screwed into the insulated tube at approximately 1½" from both ends. The eye screw heads are vertical in the final position (FIG. 2). Mounting holes (20) are approximately ¼" in diameter and are closest to both ends of the insulating tube, ½–¾" form edge. Shocking wire (100) is 16 American Wire Guage copper stranded. It is weaved in a cross-crossing vertical pattern through the eye screws shown in FIG. 2. Where wires cross (60) plastic pull ties (90) are installed vertically and drawn tight to secure wire and insulation under tie in place. Wire is not stripped of insulation, leaving insulation at locations (40, 50, and 60) about ½" on either side as shown in FIG. 2. Insulation is also left intact at locations (40a, 50a, and 80). The shocking wire (100) can be any conductive material, metal, copper or aluminum alloys. Short loose wire ends (40a and 50a) are wrapped horizontal over common conductor for 1" to 2" and taped at ends with a vinyl electrical tape. Tape is then sealed with a heat shrink plastic or rubber for added protection (80). A electric power connector (70) is located at the opposite end of both wires. The preferred embodiment (FIG. 4) shows the eye screws (10) have been eliminated by a simple process of cutting out four vertical wire holders (110) ½" wide at opposite ends of the insulated tube (30) equadistant apart. Applying heat then with a propane torch to the holders, they can be bent outward to the desired angle. These wire holders (110) with a hole drilled through them are now support for the criss-crossed shocking wires.

Materials and shapes described in this embodiment are not limited to the examples given. All materials may be found in your local hardware store.

From the previous descriptions a number of advantages of the insulated electrical shock tube become evident:

(A) Ease of installation for the consumer.
(B) Low cost to manufacture.
(C) No moving wearable parts.
(D) Universal applications, hanging or support pole.
(E) Very durable construction.
(F) Does not require expensive batteries for long term operation, environmentally safe.
(G) No maintenance required to deter voltage tracking.
(H) Totally new design of shocking device that can be used on conductive or non-conductive pole with no change in installation.

Operation—FIG. 1

The manner of using the insulated electrical shock tube (FIG. 1) in the detering of squirrels at birdfeeders is to:

a). Remove bird feeder from support pole or hanging device.
b). Slide shock tube (30) over pole or hanging device.
c). For hanging feeder, simply re-hang feeder allowing shock tube (30) to rest on roof of feeder or suspend on hanging rope or chain above roof through mounting holes.
d). For metal pole installations, position shock tube (30) directly under feeder and mark locations of mounting holes (20).
e). Lower shock tube (30) to ground over pole.
f). Drill two holes where marks of mounting holes (20) were placed.
g). Slide shock tube (30) back up pole and align holes.
h). Insert bolt(s), thread on nut(s).
i). For a wood pole, simply screw two wood screws through mounting holes (20).
j). Reinstall birdfeeder.
k). Plug extension cord into shock tube electrical power connector (70).

l). Secure shock tube electrical power connector (70) and extension cord plug together with a plug securing device or electrical tape.

m). Tape cord to pole with electrical tape.

n). For a hanging feeder wrap extension cord once or twice around limb of tree or device that is suspending feeder.

o). Plug other end of extension cord into power source.

SUMMARY, RAMIFICATION, AND SCOPE

Accordingly, the reader will see that the insulated electrical shock tube is a universal shocking device for pests with any birdfeeder application.

The ease of installation and being a one piece shocking device is a welcome advancement for the consumer. The need to drill a hole into a metal birdfeeder support pole to support the insulated electrical shock can even be eliminated by installing a clamping device around support pole at desired height for shock tube to rest on.

No moving wearable parts or expensive electronics and insulating materials makes the shock tube durable and inexpensive.

The shock tube is lightweight, stremlined, not bulky. The vertical design eliminates the voltage tracking problem that occurs with horizontal designs. Thus, the shock tube is maintenance free.

Additional advantages and applications of the insulated electrical shock tube are:

Around trash areas (restaurant, industrial, residential) to ward off racoons, possoms, and rats where poisons could kill domestic pets.

Figure 6:
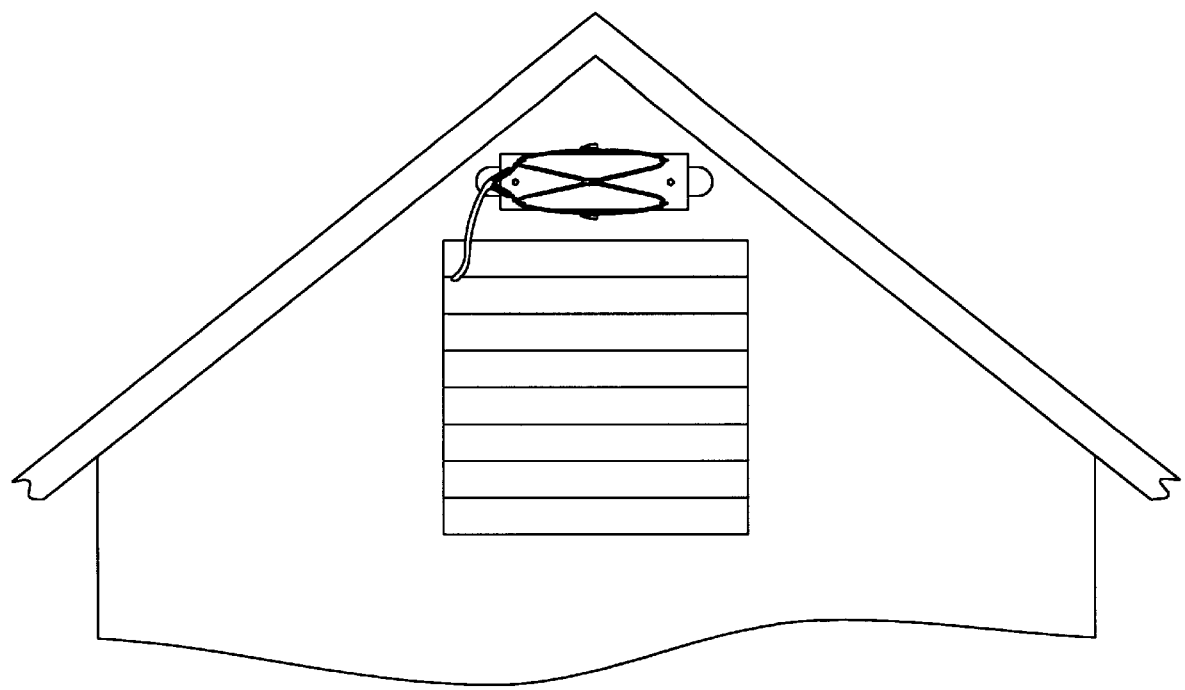
FIG. 6 shows an alternate embodiment of a insulated electical shock tube showing it installed at a roof peak overhang, to keep away nesting animals.

Installed on horizontal support rods at roof over hangs to keep pigeons from nesting and soiling homes, churchs, buildings (FIG. 6).

Figure 7:
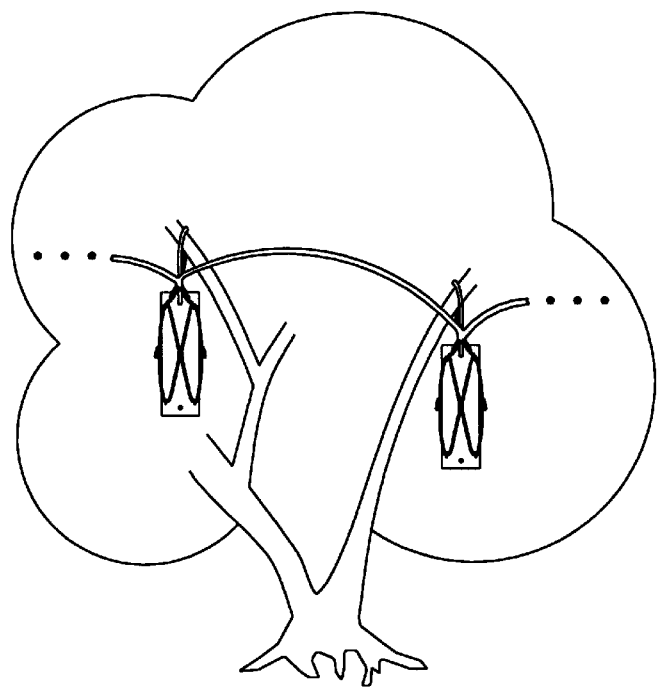
FIG. 7 shows yet another alternate embodiment showing a insulated electrical shock tube hung on expensive landscaping to deter feeding animals like deer.

Can be hung vertically in fruit trees and other expensive landscaping where deer are a problem feeding, destroying property (FIG. 7).

Can be used by electric companies at rural sub-stations enclosed with chain link fences where racoon, possoms and squirrels crawl over and in, placed in strategic locations around equipment to prevent power outage by animals.

For the avid gardner, the shock tube can be a portable electric fence around lettuce, tomatoes etc. where rabbits are a problem and a long electric fence is unwanted.

These descriptions should not be construed as limiting the scope of the invention but as merely providing illustrations of some of the presently preferred embodiments of this invention. For example, the shock tube can have other shapes, such as square, triangular and oval. The shock tube can be any length, thickness or color as long as it insulates properly the shocking voltage, whatever current is being used.

Thus the scope of the invention should be determined by the appended claims and their legal equivalents, rather than by the examples given.

I claim:

1. A electric shock device to deter pests at precise locations, comprising:
    a. a hollow predetermined electric insulating material
    b. means for stabilizing said electric insulating material to a pylon
    c. means for supporting a plurality of insulated electric conductors overlapping and surrounding said electric insulating material
    d. means for connecting said plurality of insulated electric conductors to an electric power source, whereby as pest touches a uninsulated positively and a uninsulated negatively charged section of said plurality of insulated electric conductors receives a detering electric shock by completing electric path through flesh.

2. The electric shock device of claim 1 wherein said electric insulating material insulates 120 volts.

3. Said insulating material of claim 2 is colored.

4. Said electric insulating material of claim 2 is polyvinyl chloride pipe.

5. The electric shock device of claim 1 wherein means for stabilizing said electric insulating material to said pylon is through a plurality of mounting holes at opposed ends.

6. Said mounting holes of claim 5 are for inserting a keeper to stabilize said electric insulating material to said pylon.

7. The electric shock device of claim 1 wherein means for supporting said plurality of insulated electric conductors surrounding said electric insulating material is a multiplicity of holders at opposes ends of said electric insulating material.

8. The electric shock device of claim 1 wherein said plurality of insulated electric conductors overlapping are secured in place by a plastic pull tie.

9. The electric shock device of claim 1 wherein said plurality of insulated electric conductors is wire.

10. Said wire of claim 9, is size 16 stranded American Wire Gauge copper uninsulated in disposed areas.

11. The electric shock device of claim 1, wherein means for connecting said plurality of electric conductors to said electric power source is a male electric plug connector located at one end of said plurality of insulated electric conductors.

12. The electric shock device of claim 1 wherein said electric shock device is universal to any material support pylon.

13. Said support pylon of claim 12 is a metal pole.

14. Said support pylon of claim 12 is a wood pole.

15. Said support pylon of claim 12 is a hanging rope.

16. The electric shock device of claim 1 wherein means for additional protection around said conductors is a vinyl tape wrap in disposed areas.

17. The electric shock device of claim 1 further including a heat shrink plastic insulation installed as added protection around said conductors in disposed area.

18. The electric shock device of claim 1 further including safety devices for operational safety.

19. Said safety devices of claim 18 is a plastic guard to surround said electric shock device.

* * * * *